J. B. J. FOURNIER.
HANDLE FOR COOKING VESSELS.
APPLICATION FILED JAN. 15, 1914.
1,143,898.
Patented June 22, 1915.
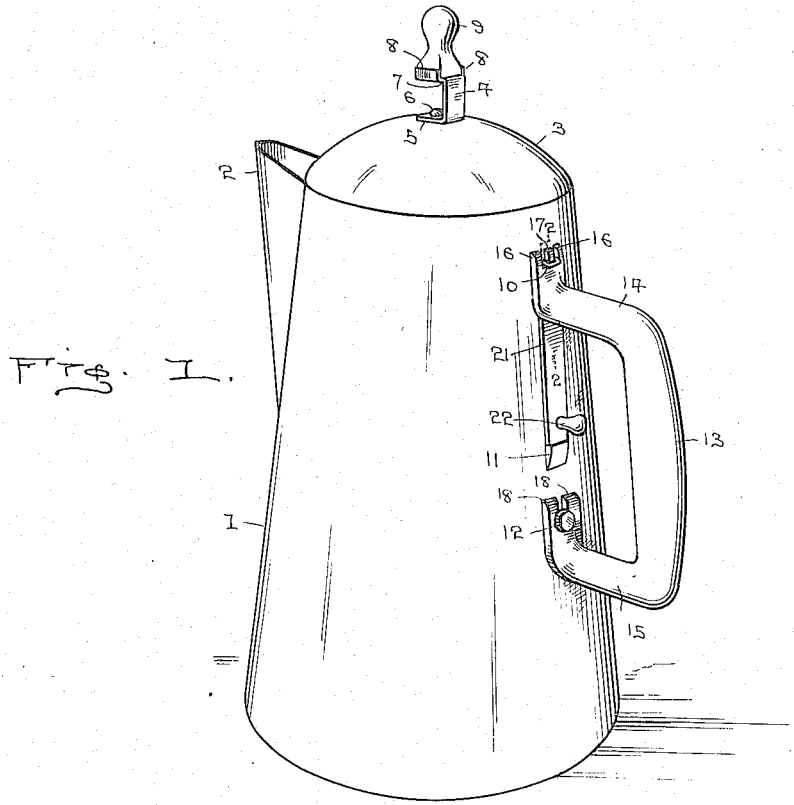
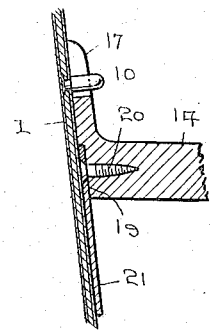
Witnesses
Inventor
J. B. J. Fournier
Attorneys

UNITED STATES PATENT OFFICE.

JOHN B. JESSE FOURNIER, OF OQUOSSOC, MAINE.

HANDLE FOR COOKING VESSELS.

1,143,898.  Specification of Letters Patent.  Patented June 22, 1915.

Application filed January 15, 1914. Serial No. 812,219.

*To all whom it may concern:*

Be it known that I, JOHN B. JESSE FOURNIER, a citizen of the United States, residing at Oquossoc, in the county of Franklin and State of Maine, have invented certain new and useful Improvements in Handles for Cooking Vessels; and I do hereby declare the following to be a full, clear, and exact description of the invention, such as will enable others skilled in the art to which it appertains to make and use the same.

This invention relates to handles for vessels and is more particularly adapted to handles for use in connection with cooking utensils, and has for one of its objects the provision of a handle which will not become heated, thus obviating the danger of burning the hands of the user.

A further object of this invention is the production of a readily attachable and detachable handle for cooking utensils, efficient in purpose, simple in structure and cheap in manufacture.

A still further object of this invention is the provision of means for retaining the handle in its attached relation to the cooking utensil in a manner for preventing the objectionable features of structures of this character such as wabbling from insecure connections. And a still further object of this invention resides in the provision of means for eliminating the danger of the handles for cooking utensils and the lids therefor from becoming overheated.

With these and other objects which will more fully appear and the nature of the invention more clearly understood by the construction, arrangement and combination of the parts thereof as described in the following specification, defined in the appended claims and illustrated in the accompanying drawings, in which, Figure 1 is a perspective view of a cooking utensil showing the handles constituting my invention and in attached position thereon. Fig. 2 is a fragmentary sectional view of the upper part of the handle taken on line 2—2 of Fig. 1 showing the mounting of the retaining spring therein and the engagement of one of the claws of the handle with the staple upon the cooking utensil.

I desire to here state that for the sake of convenience and illustration, I have shown my invention as applied to a coffee pot, but the same is equally adapted for use upon pots, kettles and other cooking utensils, as well as upon any of the well known devices to which an attachable and detachable handle is adapted.

By referring to the drawings in which like reference characters denote corresponding parts throughout the views of the drawings, 1 denotes the coffee pot provided with the spout 2 and having arranged upon the top thereof the lid 3. Mounted upon the top 3 is a stem 4 provided with the laterally extending base 5 which base is secured upon the central portion of the lid 3 by means of rivets or other suitable fastening means 6, the stem 4 is further provided with the laterally extending knob retaining plate 7 arranged above the plane of the base 5, the plate 7 being provided with the upwardly turned retaining flanges 8, 8 for engaging the sides of the base portion of the knob 9 which is seated between the flanges 8, 8 and upon the plate 7 and otherwise secured therein in any suitable manner.

Mounted upon the pot 1 at the side diametrically opposite the spout 2 and arranged in vertical alinement with each other is the staple 10 adjacent the upper edge of the body 1 and below which and spaced therefrom is a lug 11, and positioned below the lug 11 and also spaced therefrom is a retaining pin 12. Adapted for engaging the staple 10, the lug 11 and the pin 12 is the handle 13, which handle is provided with the laterally extending upper arm 14 and the lower lateral arm 15 corresponding and parallel with the arm 14, the extremity of the arm 14 being flattened and upwardly turned and formed to provide the outer claws 16 and the central claw 17, the outer claws 16 adapted to impinge the exterior side of the staple 10 and the central claw 17 being adapted to pass upwardly through the staple 10, the flattened portion of the arm 14 providing a broad bearing surface against the outer wall of the pot 1 and together with the impinging action of the claws 16 upon the staple 10, as well as the passage of the claw 17 through the staple 10 provides a rigid connection thereat. The arm 15 of the handle 13 also has its extremity thereof upwardly bent and flattened in the same manner as that portion of the arm 14, with the exception that the upwardly extending portion of the arm 15 is provided with claws 18, 18, which claws are designed to pass at each side of the retaining pin 12 and under the head thereof for securing the arm 15 to the pot 1.

Formed within the flattened portion of the arm 14 is the recess 19 into which and adapted to be securely seated and retained therein by the screw or other means 20 is the spring latch 21, the free end of which is designed for engaging the upper horizontal wall of the lug 11, and arranged upon one side of the spring latch 21 and adjacent the free end thereof is the knob 22 provided for operating the spring latch 21 for removing the extremity thereof from its engagement with the horizontal wall of the lug 11 when it is desired to remove the handle 13 from the pot 1.

When it is desired to detach the handle from the pot 1 or other vessels to which the same may be attached, it is only necessary to grasp the handle 13 with the hand and by engaging the knob 22 with the fingers and drawing the same outwardly which movement of the knob 22 disengages the free end of the spring latch 21 from the horizontal wall of the lug 11, and in this position the handle is pressed downwardly for causing the claws 16 and 17 of the arm 14 and the claws 18 of the arm 15 to become disengaged from the staple 10 and the retaining pin 12 respectively. Should it be desired to attach the handle 13 to the pot 1 the operation is somewhat the reversal of the former operation as the claws 16 and 17 and the claws 18, 18 are positioned slightly below the staple 10 and the pin 12 with the spring latch 21 bearing upon the inclined face of the lug 11, whereupon, by a slight inward pressure and upward movement of the handle 13, the claws 16 and 17 engage the staple 10, the claws 18 engage the pin 12, and the free end of the spring latch 21 will pass into engagement with the horizontal wall of the lug 11, the handle 13 being thus placed in its secured attached position upon the pot 1 or other vessel to which the same may be applied.

While I have here shown and described the preferred embodiment of my invention, I hereby reserve the right to make such alterations and variations therein as I may deem expedient from time to time and which will not depart from the spirit of this invention or conflict with the scope of the claims.

Having thus fully described my invention what I claim as new, and desire to secure by Letters Patent of the United States is:—

1. A vessel having a retaining pin with an enlarged head projecting from the wall of the vessel, a staple vertically disposed above said lug and having parallel sides and a central aperture, a lug having an upper horizontal surface projecting from said vessel between said pin and staple, a handle having two parallel arm members horizontally disposed, each having angular projections rising vertically, each projection having a plurality of attaching claws to engage said pin and staple to attach said handle to said vessel, and a depending leaf spring latching member fastened to the end of the upper horizontal arm and adapted to seat upon the horizontal surface of the lug to retain said handle upward in attached position to said vessel.

2. A vessel having a lug with a horizontal upper surface projecting from said vessel, a spring-like vertically disposed latching member seated upon and supported by said latch device, a staple above and a lug below said latch device, a handle having two upturned ends with claws thereon adapted to be pushed upward into engagement with said pin and staple, said claws attaching said handle to said vessel, and fastening means connecting said handle to the upper end of said lug, said lug thereby supporting said handle in upward position.

3. A vessel having a horizontal retaining pin and a horizontal staple vertically disposed to each other, projecting from the wall of said vessel, a handle engaged with said pin and staple, said engaging operation being derived from a vertical upward movement of said handle, a lug having an upper horizontal surface projecting from the wall of said vessel between said pin and staple, and a flexible leaf spring supporting device fastened at its upper end to the upper portion of said handle and adapted to slide over and rest upon said horizontal surface of said lug to support said handle in its engagement with said pin and staple.

In testimony whereof I have signed my name to this specification in the presence of two subscribing witnesses.

JOHN B. JESSE FOURNIER.

Witnesses:
  U. H. McKENZIE,
  CLIFF S. HILL.